April 26, 1960
R. G. WINKLER
2,934,199
FEEDING APPARATUS
Filed July 25, 1957
2 Sheets-Sheet 1
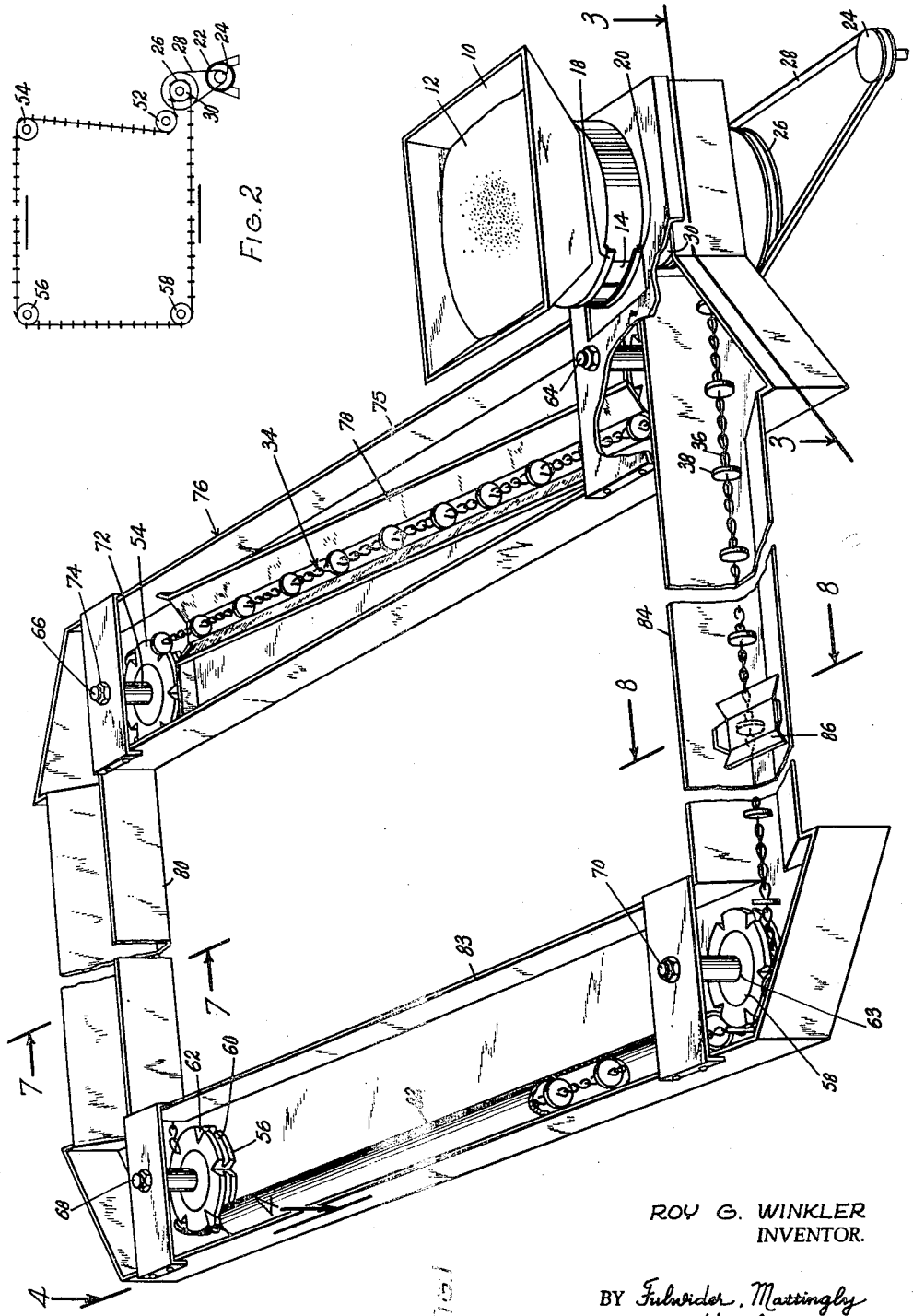
ROY G. WINKLER
INVENTOR.
BY Fulwider, Mattingly
and Huntley
ATTORNEYS.

April 26, 1960

R. G. WINKLER 2,934,199

FEEDING APPARATUS

Filed July 25, 1957

ROY G. WINKLER
INVENTOR.

BY Fulwider, Mattingly
and Huntley
ATTORNEYS.

United States Patent Office 2,934,199
Patented Apr. 26, 1960

2,934,199

FEEDING APPARATUS

Roy G. Winkler, San Marcos, Calif.

Application July 25, 1957, Serial No. 674,152

1 Claim. (Cl. 198—168)

The present invention relates generally to automatic feeding apparatus, and more particularly to an automatic system for distributing loose feed.

It has previously been proposed, to automatically distribute loose feed for consumption by utilizing conveyor systems. One conveyor system of this type has utilized various channels as troughs or tubes in conjunction with a longitudinal element which moves through the channel carrying loose feed with it. In this manner, the loose feed is distributed to various feeding places, and further distributed within such feeding places. Automatic feeding systems of the type described above have in the past generally been constructed primarily of metal. As a result, these systems have been quite expensive. Additionally, systems of this type wherein metal may rub against metal often incur substantial wear due to a slight maladjustment. As a result, the acquisition and operation of these systems normally involves substantial expense.

Another difficulty encountered in the operation of feeding apparatus of the above type has been that the moving element serving to impart motion to the loose feed may sometimes jam against the channel thereby damaging the rigid elements of the system. Additionally, feeders of this type are somewhat dangerous in use, because objects sometimes become caught between the channel and the moving apparatus. In such an instance, the apparatus is often damaged or the object caught between the moving and stationary members is severed. As a result, a continual hazard exists both to people working with the feeders and to the animals or fowl being fed thereby.

According to the present invention, a channel is provided through which loose feed is moved. A feed-moving apparatus, consisting of resilient deformable members which are mounted upon a chain, is then placed within the channel through which the feed is to be transported. A pulley, formed to have a resilient deformable outer periphery which is grooved and notched is then placed in contact with the feed-moving apparatus to support the feed-moving apparatus and impart motion thereto.

It is therefore a major object of this invention to provide an improved loose-feed-distributing apparatus.

Another object of this invention is to provide a feed-distributing apparatus which is more economical in construction and use.

Still another object of the present invention is to provide a feed-distributing apparatus which does not readily jam, and which is safe in operation.

A further object of the present invention is to provide an improved form of a feed-moving apparatus utilizing resilient deformable members.

Still a further object of the present invention is to provide an improved pulley for driving or carrying various chains or longitudinal members.

These and other objects and advantages of the present invention will become apparent from the following specification and accompanying drawings in which:

Figure 1 is a perspective view of a feed-distributing system constructed in accordance with the principles of the present invention;

Figure 2 is a schematic diagram showing the motion circuit of the system shown in Figure 1;

Figure 3:
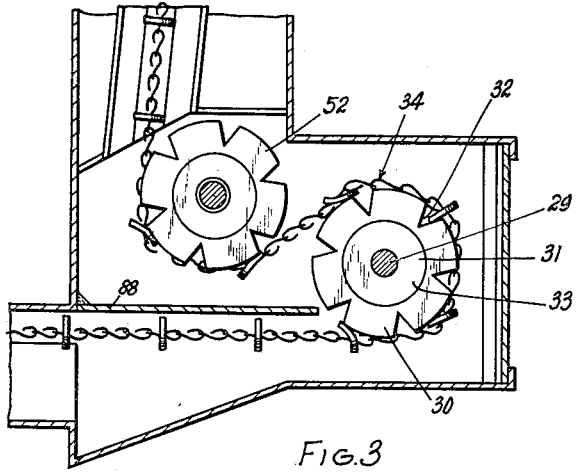
Figure 3 is horizontal sectional view taken along the line 3—3 of Figure 1.
Figure 4:
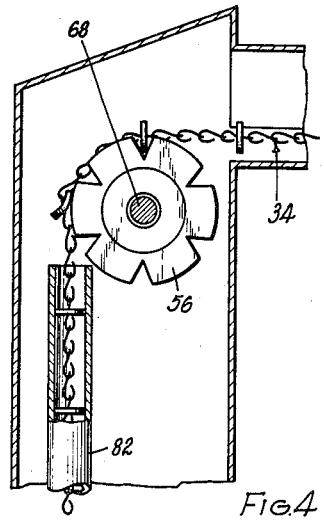
Figure 4 is a horizontal sectional view taken along the line 4—4 of Figure 1.

Referring now to the figures, and particularly to Figure 1 thereof, there is shown a hopper 10 into which loose feed 12 is placed for distribution to feeding troughs. The hopper 10 contains an outlet 14 which is partly covered by a curved plate 16. The plate is slidably supported in brackets 18 and 20. The position of the plate 16 may therefore be altered to control the rate at which feed is dispensed from the hopper 10.

Mounted within the hopper 10, is an agitator (not shown) which serves to prevent the loose feed from clogging in the opening 14. Various agitators as are well-known in the prior art may be employed to perform this function; for example, simply a revolving disk with irregularities may function satisfactorily. The source of power for the agitator in the hopper 10 is a motor 22 (shown in Figure 2). The motor 22 drives a pulley 24 which in turn drives a pulley 26 through a V-belt 28. The agitator in the hopper 10 is mounted upon a shaft 29 with the pulley 26. It is to be noted, that various apparatus for imparting motion to the pulley 26 from a prime mover may be employed, as a gear train or direct drive.

Mounted upon the shaft 29 with the pulley 26 is a drive pulley 30, as shown in Figure 3. The drive pulley 30 has an inner section 31 made of a substantially rigid material. This inner section 31 is pierced by the shaft 29, the pulley being fixed to the shaft as by a pin or key. The outer section 33 of the pulley 30 is formed of a resilient deformable material, e.g. natural or synthetic rubber, and is provided with radial notches 32 and an annular groove. It is to be noted, that the radial notches 32 penetrate deeper into the pulley 30 than the annular groove.

Figure 5:
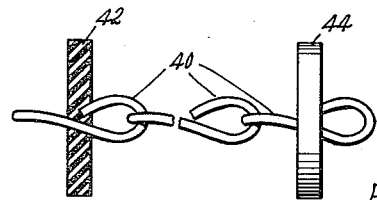
Figure 5 is a partly sectionalized plan view of one form of feed-moving apparatus which may be utilized in the system of Figure 1.
Figure 6:
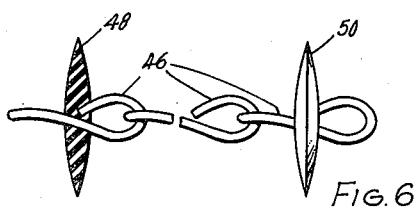
Figure 6 is a partly sectionalized view of another form of feed-moving apparatus which may be utilized in the system of Figure 1.

Mounted to engage the pulley 30 is the feed-moving apparatus, endless chain 34, consisting of a metal chain links, e.g. link 36, with resilient deformable feed-contacting members, e.g. disk 38, mounted thereon. Detailed views of two forms of satisfactory chains which may be used as the chain 34 in the system of Figure 1 are shown in Figures 5 and 6. In Figure 5, links 40 are interconnected to form a longitudinal flexible member. It is to be noted, that each of the links 40 are formed in such a manner as to have a center section of reduced size. That is, the ends of the rods from which the links are made are folded back to produce a form somewhat in the shape of a figure 8. As a result, a small section is formed at the center of each link. Mounted at the small section of certain of the links 40 are disks 42 and 44. The disks 42 and 44 are formed of a resilient deformable material, e.g. natural or synthetic rubber, or synthetic materials as nylon. The disks are held upon the links 40 by the link passing through a hole in the disks. The disks 42 and 44 are formed to have a rectangular cross-section. That is, the disks as shown in Figure 5 are flat and of substantially uniform thickness. In one satisfactory embodiment of the present invention the disks have been formed of synthetic rubber having a thickness of ⅛ inch.

In the chain shown in Figure 6, links 46 are formed substantially similar to the links 40 of Figure 5. The disks 48 and 50, however, of the chain embodiment shown in Figure 6 are tapered to have a convex cross-section. That is, the opposing faces of the disks 48 and 50 are each formed convex relative to the plane of the disk.

Referring back now to Figure 1, the chain 34 may be seen to be supported upon pulleys 52, 54, 56 and 58. These pulleys are formed similar to the drive pulley 30. That is, with an outer section of deformable resilient material (penetrated by a groove, e.g. groove 60, and notches, e.g. 62) which is mounted upon a rigid inner section.

The pulleys 52, 54, 56 and 58 contain bearings as bearing 63, which enable these pulleys to ride respectively upon shafts 64, 68 and 70. These shafts carry spacers, e.g. 72, which serve to hold the pulleys correctly positioned relative to the shafts. The shafts are fixed in position by nuts, e.g. nut 74. The supporting structure for the pulleys 52, 54, 56 and 58 with their accompanying shafts is a frame 76. The pulleys are mounted upon the frame 76 to carry the endless chain 34 as it leaves the area adjacent to the hopper 10 and returns to this same area. The chain 34 passes from the hopper 10, through a first channel comprising a trough 78. The trough 78 is of generally U-shaped cross-section and is supported by another trough-like section 75 in the frame 76.

Figure 7:
Figure 7 is a vertical sectional view taken along the line 7—7 of Figure 1.

After passing through the trough 78, the chain 34 is carried over the pulley 54 and passes through a trough section 80 of the frame 76. The trough section 80 comprises a trough from which feed will be consumed. That is, the loose feed is carried to be distributed along the trough 80 to provide feed for chickens for example. The manner in which the chickens will feed from the trough 80 may be best seen in Figure 7. It is to be noted, that the length of the trough 80 may reach 200 feet in various embodiments of the present invention.

After passing through the trough 80, the chain 34 passes over the pulley 56 and then enters the channel comprising a tube 82. The tube 82 is supported in a section 83 of the frame 76. The tube 82 performs the same function as the trough 76 of supporting the loose feed adjacent to the chain 34. These elements may be alternatively used in most arrangements, with the exception that the tube 82 should normally be used when the loose feed is transferred from one level to another in a vertical fashion.

Figure 8:
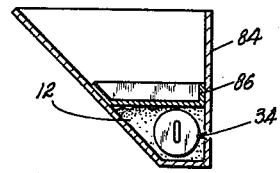
Figure 8 is a vertical sectional view taken along the line 8—8 of Figure 1.
Figure 9:
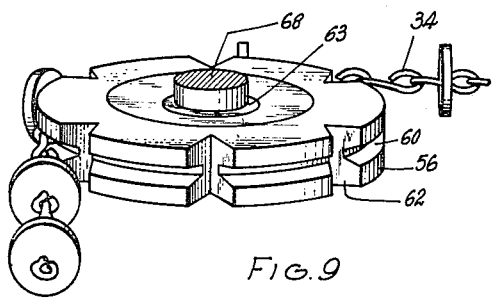
Figure 9 is an enlarged perspective view of a portion of the system shown in Figure 1.

After passing through the tube 82, the chain 34 passes over the pulley 58 and into the trough section 84 of the frame 76. The trough section 84 is similar to the trough section 80 and constitutes another feed-dispensing trough. The trough section 84 includes a chain-positioning apparatus 86. This apparatus 86 is affixed to the sides of the trough 84 as shown in Figure 8, and serves to hold the chain adjacent to the bottom of the trough. In various embodiments of the present invention wherein the length of the trough 84 is extensive, the frame 76 tends to settle over a period of use, and the settlement is not normally uniform. As a result, the chain 34 will not uniformly traverse the lower portion of the trough as is desired. In such an instance, apparatus 86 is placed above the chain 34 to hold it depressed in the lower part of the trough.

After passing through the trough 84, the chain 34 passes over the drive pulley to complete its endless path. As best shown in Figure 3, the path of the chain 34 is adjacent on the sides of the plate 88. The plate 88 is therefore provided to separate the conflicting actions of the chain 34 at this point.

The pulleys, e.g. pulley 52, and the disks, e.g. disk 38, which are used in the described embodiment, may be formed in a variety of ways. In two alternative methods of manufacture these elements may be either molded in the form shown, or cut from stock. That is, the disks 42 and 44 as shown in Figure 5 may simply be cut or stamped from a sheet of resilient deformable material. Of course, the disks 48 and 50 as shown in Figure 6 are more readily manufactured by molding, due to their varying thickness.

The pulleys, e.g. 30, may be formed by cutting a groove as the groove 60 and radial notches as notch 62 in a wheel having an outer section formed of resilient deformable material which is supported upon a rigid inner section. Or alternatively the pulleys may be molded with the grooves and notches formed therein.

Once the disks as disks 42 or 48 have been formed, these elements are positioned upon links as the links 40 or 46, to form the composite feed-moving chain. Various methods may be used for placing the disks upon the links; however, a direct method is simply to open one side of a link and insert it through an aperture cut in the disks.

After assembly of the feed-moving chain 34, and the pulleys, e.g. 54, these elements are mounted upon the frame 76 with the various channels. The hopper 10 is then attached to form the unit as shown in Figure 1. Due to the light construction of the chain 34 and the pulleys, the frame 76 may be formed of light material to result in a construction economy. Of course, various means may be employed to support the unit of Figure 1 adjacent to feeding cages; however, such means are well-known in the prior art and constitute no part of the present invention.

To use the described embodiment of the present invention, it is simply necessary to fill the hopper 10 with loose feed 12 and energize the motor 22. When the motor 22 is energized, the agitator within the hopper 10 causes feed to fall from the opening 14 of the hopper at a rate governed by the position of the plate 16 in the brackets 18 and 20. This feed will fall in the path of the chain 34 and therefore be motivated into the trough 78 by the chain 34. The chain 34 is driven by the pulley 30, which is turned by the shaft 29. The engagement between the chain 34 and the drive pulley 30 is effected by the combination of friction between these members and positive engagement of the disks in the notches of the pulley. The spacing between the notches in the pulley and the disks on the chain need not be arranged to cause the notches to always receive a disk; however, in a random arrangement, the disks fall into the notches with sufficient frequency to improve the coupling between the pulley and the chain.

After the feed is moved through the trough 78, it is passed around the enclosure surrounding the pulley 54, and enters the trough 80. Feed distributed in the trough 80 is placed in a position where it may be consumed. However, some feed continues to move through the trough 80 to pass around the enclosure surrounding the pulley 56. This feed enters the tube 82 to pass on to the enclosure surrounding the pulley 58 and be distributed along the trough 84 to provide food in another feeding location. The disks on the chain 34 have a diameter which nearly coincides to the inside diameter of the tube 82. As a result, the loose feed is moved through the tube 82 in a positive manner. Therefore, a tube, as the tube 82, will normally be used as a feed channel when the feed is moved vertically from one level to another.

In the operation of the feeder shown in Figure 1, some of the loose feed is carried beyond the trough 84 and returned to the area adjacent the hopper 10. This feed is simply re-cycled through the channels, and again distributed for consumption. The feed which passes through a complete cycle of travel through the system passes adjacent to the feed moving from the area adjacent the hopper 10. As shown in Figure 3, the plate 88 serves to maintain the feed traveling away from the pulley 52 separate from the feed traveling toward the pulley 52. If this plate is not provided, feed will tend to pile up, resulting in poor distribution and overflow near the hopper.

As the loose feed is moved around the pulleys in the system shown in Figure 1, it may tend to become packed into the grooves, as the groove 60 in the pulley 56. This packed feed may become so tightly embedded in a groove in a pulley as to disengage the chain from the pulley. However, according to a feature of the present invention whereby the notches are provided in the pulleys, the feed is provided with exit openings through which to leave a groove in a pulley. That is, as the loose feed tends to become backed into a groove, the action of the chain urging the feed against the surfaces of the groove causes the feed to be forced out of the notches, thereby removing feed from the groove. In this manner the pulleys are relieved from accumulating feed in their grooves.

In various applications of this system, automatic timing arrangements may be provided to turn on the electrical motor 22 during certain periods of the day. Of course, this will depend to a large extent on the number of chickens or other fowl or animals being fed, and also upon the individual desires of the operator. Various automatic control arrangements are, of course, well known in the prior art.

In using the system of the present invention, at certain times it may be desirable simply to agitate the existing feed in the feeding troughs as 80 and 84. The desirability of performing such agitation exists because chickens, for example, tend to lose interest in feed which has lain in one position over a period of time. Therefore, the motor 22 may be periodically energized while the plate 16 is positioned to completely cover the opening 14, thereby preventing further feed 12 from being added to the cycling feed. During an operation of this type, the feed will simply be moved and stirred, and thereby freshened to stimulate further interest therein by the chickens.

From a consideration of the above-described embodiment of the present invention, it may be seen that several advantages exist relative thereto. One advantageous feature resides in the safety considerations of the system. For example, in locations where the disks enter the tube 82, it may be seen that any obstruction which falls between the moving disks and the stationary tube will normally simply fold the deformable disk back and enable continual movement of the chain 34. This same operation makes it unlikely that human or animal parts will be caught between the moving chain and the stationary portions of the feeder.

In this same regard, in the event of misalignment between the chain 34 and the tube 82 or the apparatus 86, the flexible disks will be deformed to pass these members without damage either to the disks or the channels.

The present invention also enables feeders to be constructed in an economical manner since the disks formed in the chain 34 and the pulleys, as 54, may be molded in large quantities and do not involve expensive metal operations and because of the light nature of these components, the frame and troughs may be constructed of less expensive light material. With regard to the economy involved in the use of the present apparatus, considerable merit exists. As the disks in the chain 34 travel through the channels, they may contact the channels. In other systems, this contact might lead to cause considerable wear. However, in the present system in which the disks are formed of a deformable resilient material, the wear is nominal. Wear between the chain 34 and the pulleys upon which it rides is also very small.

It may therefore be seen, that the present invention provides an improved system for distributing loose feed for consumption.

Various modifications and changes may be made with respect to the foregoing description without departing from the spirit of the invention or the scope of the following claim.

I claim:

A feeding system for distributing feed comprising: a channel for supporting said feed; feed-moving apparatus including a chain formed of a plurality of interconnecting links comprising a length of uniform diameter wire having the ends thereof curved to form a pair of substantially-closed loops, and a plurality of disk-like resilient deformable members, substantially smaller in cross section than said channel, certain of said links passing through said disk-like members, to thereby support said members contiguous to said channel and between said loops; at least one pulley comprising a wheel including a bearing surface axially positioned in said wheel for supporting said wheel, said wheel having an outer annular section formed of resilient deformable material, with an annular groove in said section adapted to receive said chain and radial notches extending to a greater depth in said pulley than said groove; and means for imparting motion to said feed-moving apparatus to cause said feed to be distributed in said channel.

References Cited in the file of this patent

UNITED STATES PATENTS

| | | |
|---|---|---|
| 158,193 | Barker | Dec. 29, 1874 |
| 164,098 | Merrill | June 8, 1875 |
| 216,463 | Secord | June 10, 1879 |
| 299,373 | Gardner | May 27, 1884 |
| 1,704,150 | Riley | Mar. 5, 1929 |
| 1,857,896 | Vellino | May 10, 1932 |
| 2,147,199 | Hapman | Feb. 14, 1939 |
| 2,188,025 | Weiss | Jan. 23, 1940 |
| 2,333,926 | Hapman | Nov. 9, 1943 |
| 2,357,651 | Hapman | Sept. 5, 1944 |
| 2,374,644 | Bombardier | May 1, 1945 |
| 2,554,589 | Patz et al. | May 29, 1951 |
| 2,556,182 | Hapman | June 12, 1951 |
| 2,609,081 | Hapman | Sept. 2, 1952 |
| 2,667,263 | Bigler et al. | Jan. 26, 1954 |